(12) United States Patent
Stephens

(10) Patent No.: US 6,534,729 B1
(45) Date of Patent: Mar. 18, 2003

(54) WEIGHING SCALE WITH SCALE PAN AND BODY MADE FROM A PARTICULATE OF NATURAL STONE

(75) Inventor: Brian Stephens, Dublin (IE)

(73) Assignee: Terraillon Holdings Limited (IE)

( * ) Notice: Subject to any disclaimer, the term of this patent is extended or adjusted under 35 U.S.C. 154(b) by 0 days.

(21) Appl. No.: 09/711,267

(22) Filed: Nov. 9, 2000

(30) Foreign Application Priority Data

Nov. 9, 1999 (GB) .............................................. 9926535

(51) Int. Cl.⁷ .............................................. G01G 21/22
(52) U.S. Cl. ..................................................... 177/262
(58) Field of Search ..................... D10/91, 92; 177/142, 177/254, 262, 264

(56) References Cited

U.S. PATENT DOCUMENTS

| | | | | |
|---|---|---|---|---|
| 3,187,826 A | * | 6/1965 | Traff | 177/142 |
| 4,800,973 A | | 1/1989 | Angel | 177/211 |
| 4,844,189 A | * | 7/1989 | Shisgal et al. | 177/211 |
| 5,606,126 A | * | 2/1997 | Glenville | 177/148 |
| 5,886,302 A | * | 3/1999 | Germanton et al. | 177/211 |

FOREIGN PATENT DOCUMENTS

| | | |
|---|---|---|
| FR | 2 426 892 | 12/1979 |
| GB | 603210 | 6/1948 |
| GB | 1192170 | 5/1970 |
| WO | WO 00/49375 | 8/2000 |

OTHER PUBLICATIONS

"426 Nickel Bahroom Scale Scale Hampshire–Designer Granite" <http://www.earthcommerce.com/cgi–win/dream55.exe/~p999000162011> copyright 1999.*

* cited by examiner

Primary Examiner—Randy W. Gibson
(74) Attorney, Agent, or Firm—Ostrager Chong & Flaherty LLP

(57) ABSTRACT

A scale for measuring weight with natural stone on the surface of the base of the scale. The natural stone has a pleasing aesthetic appearance, is comfortable to stand on and is hygienic.

17 Claims, 3 Drawing Sheets

WEIGHING SCALE WITH SCALE PAN AND BODY MADE FROM A PARTICULATE OF NATURAL STONE

FIELD OF INVENTION

The invention relates to a weighing device, and particularly to such a device as a scale in the form of a personal weighing scale.

BACKGROUND OF INVENTION

Personal weighing scales are used usually by users who stand on them with bare feet, and as such need to be hygienic, have a comfortable "feel", and aesthetic.

SUMMARY OF INVENTION

It is an object of the invention to provide such a scale.

According to the invention there is provided a scale, having at least a part of the body comprising a natural stone.

The scale may be a personal weighing scale at least part of the platform of which may comprise natural stone. This provides a hygienic scale.

A surface of the platform may suitably comprise natural stone.

Moreover, a base of the scale may comprise a natural stone. Thus a majority of the whole scale may be of natural stone.

The stone may be particulate and moulded to a desired shape with a binder, particularly a resin binder. This provides a relatively easily manufactured scale.

The natural stone may comprise granite, or a marble, or a durable slate.

The scale is suitably an electronic scale, which may include a housing including an LFD and a viowing lens. The lens may be elliptical.

A scale embodying the invention is hereinafter described, by way of example, with reference to the accompanying drawings.

DETAILED DESCRIPTION OF INVENTION

Figure 1:
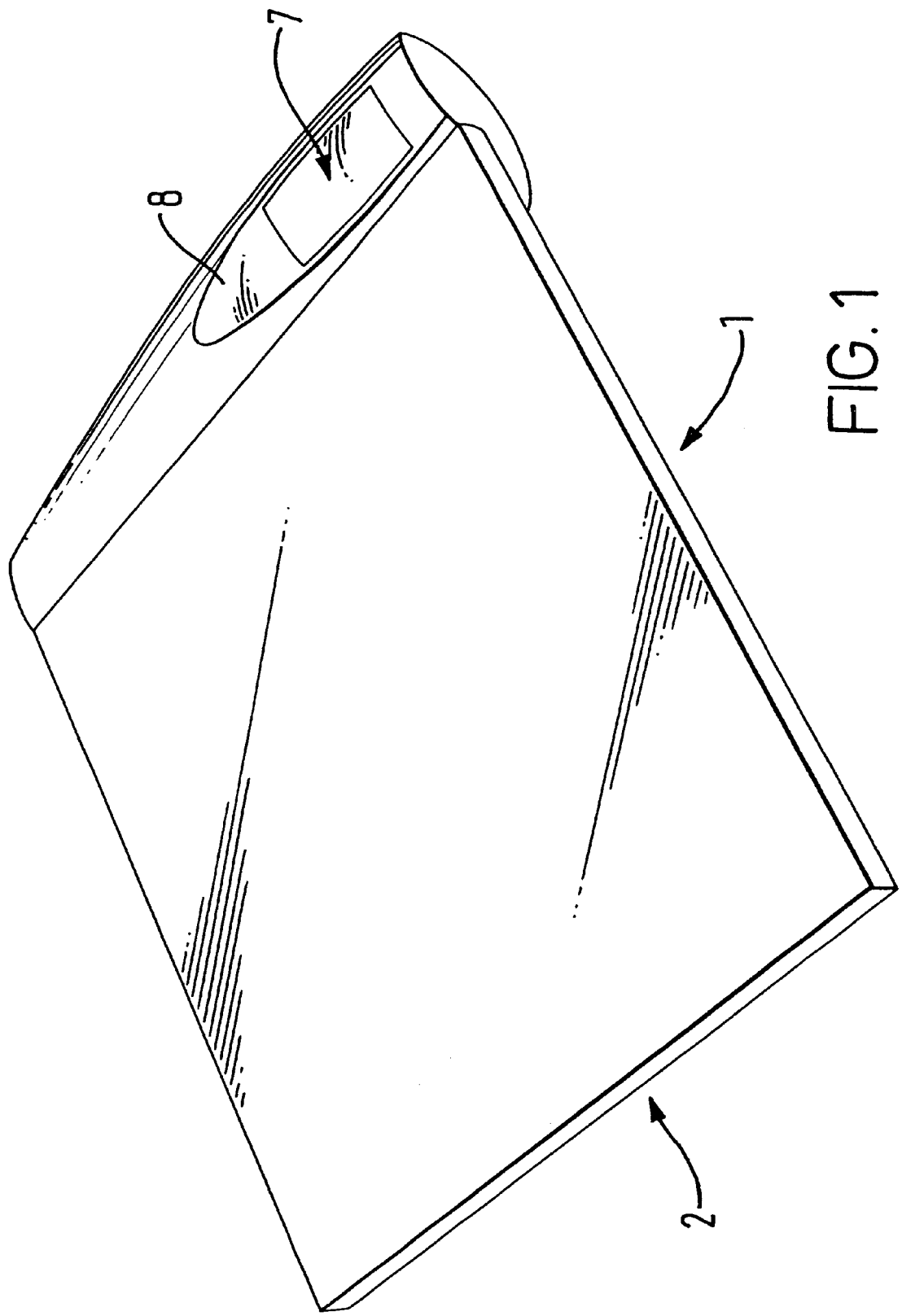
FIG. 1 is a perspective view of a scale according to the invention.

Referring to the drawings, there is shown a scale 1, in the embodiment a personal weighing or bathroom scale, at least a part of the body 2 of which comprises a natural stone.

The body 2 comprises a base 3 and a platform 4 which is designed to reciprocate substantially vertically with respect to the base 3 when a user stands on it to operate a weight sensing mechanism or device 5 so that the weight of the person can be read.

In the embodiment, the platform 4 and base 3 are formed from a natural stone, the stone being any natural stone product through a granite, a marble or a durable slate material are generally preferred.

The stone can be carved, or sculpted to a desired shape, but in a preferred scale the stone product is particulate and is moulded to a preferred shape with a binder such as a resin binder.

Figure 2:
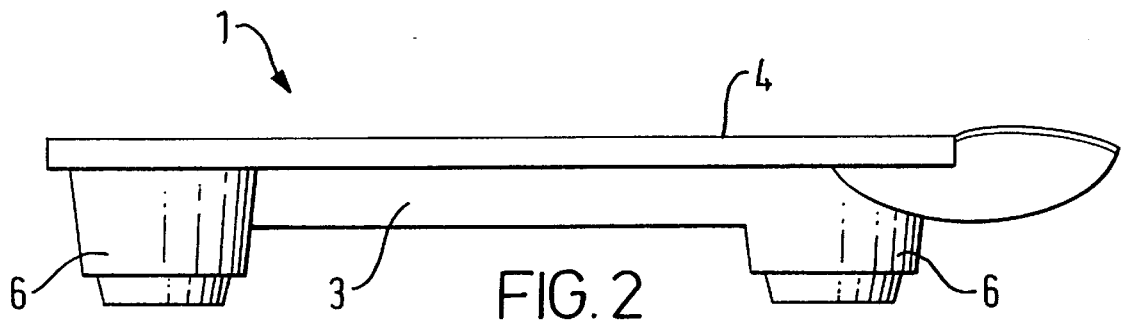
FIG. 2 is a side view of the scale of FIG. 1.
Figure 3:
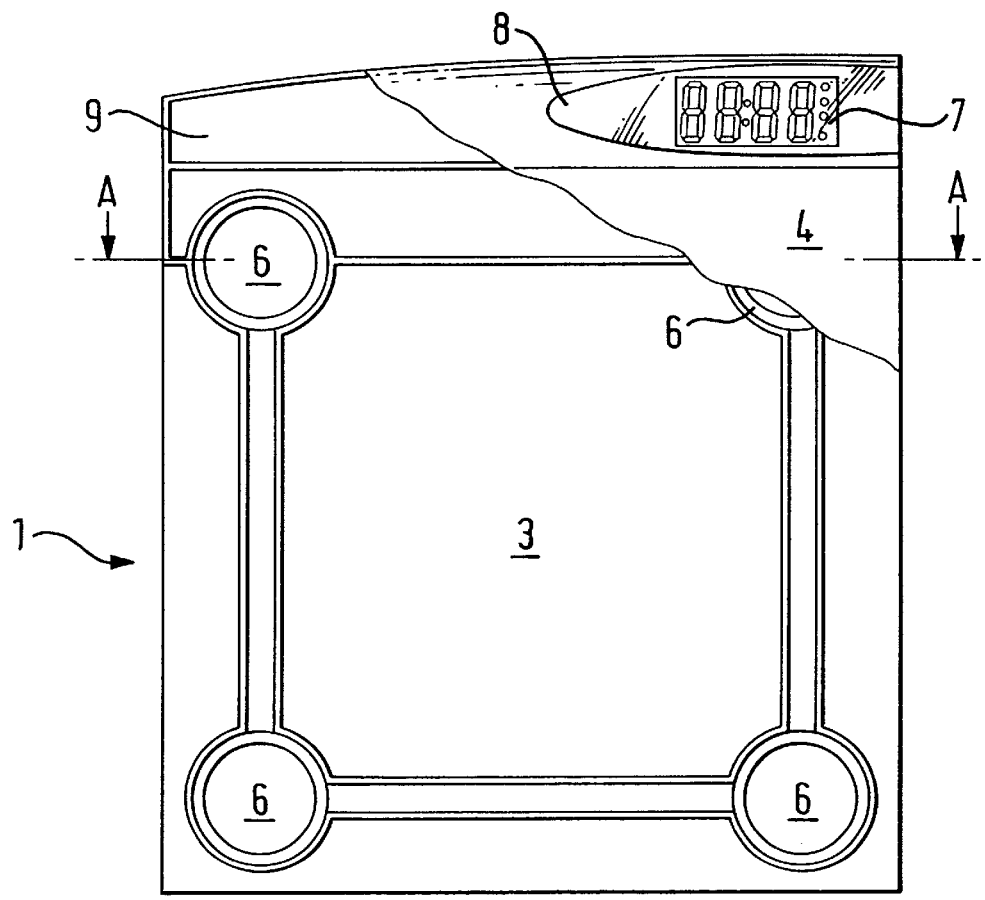
FIG. 3 is a plan view with part of the top cut away to show the base.
Figure 4:
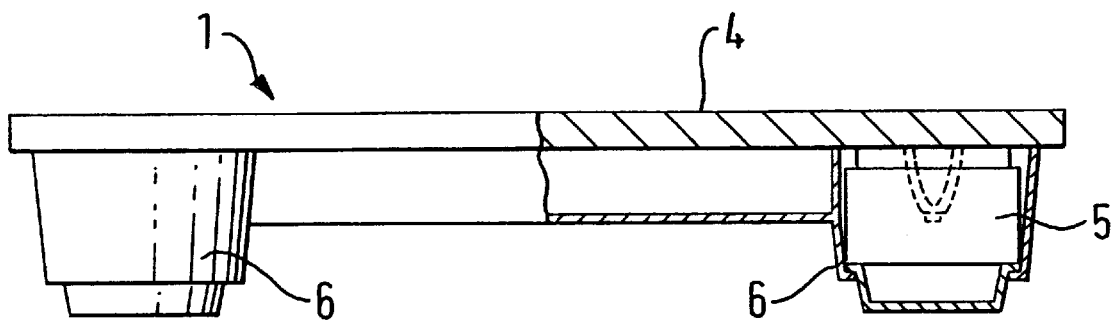
FIG. 4 is a view from one end, partly in section along line A—A.
Figure 5:
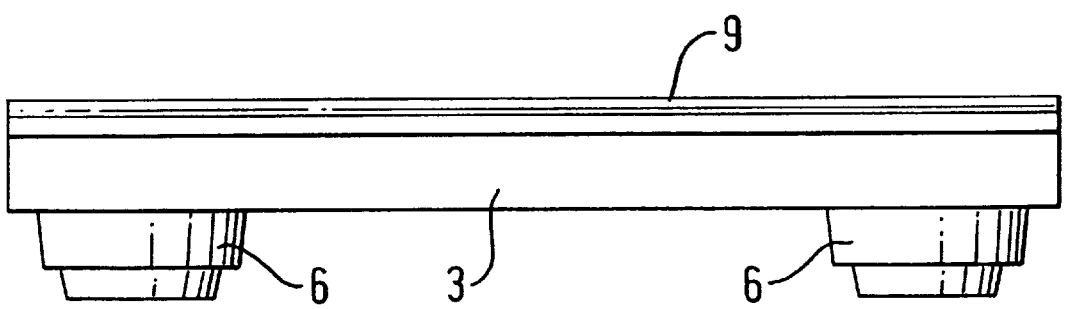
FIG. 5 is an elevational view from the other end.

The base 3 has feet 6 for setting down on a support surface such as a floor. One foot 6' is hollow and houses electronic circuitry and the mechanism 5 such as a piezo-electric mechanism which on application of a weight displays that weight via an LED 7 which is viewed through an elliptical lens 8 in a housing 9 at one end of the scale 1. The housing 9 is of generally meniscus shape in section, as seen in FIG. 2.

The platform 4, being of stone is hygienic, has a comfortable "feel", and a pleasing natural aesthetic look.

It will be understood that only a surface of the platform may be stone, which may be applied to and secured to a non-stone underlying part of the platform.

What is claim is:

1. A scale comprising a body having a platform, wherein said platform and body comprise, at least in part, a natural stone, wherein said stone is particulate and moulded to a desired shape with a binder.

2. A scale according to claim 1, comprising a personal weighing scale at least part of the platform of which comprises natural stone.

3. A scale according to claim 1, a surface of the platform comprising natural stone.

4. A scale according to claim 2, a base thereof comprising a natural stone.

5. A scale according to claim 1, wherein the binder comprises a resin.

6. A scale according to claim 1, the natural stone comprising granite.

7. A scale according to claim 1, the natural stone comprising a marble.

8. A scale according to claim 1, the natural stone comprising a durable slate.

9. A scale according to claim 1 comprising an electronic scale.

10. A scale according to claim 9, a housing including an LED and a viewing lens.

11. A scale according to claim 10, the lens being elliptical.

12. A scale comprising a body having a platform, wherein said platform and body comprise, at least in part, a natural stone, wherein said stone further comprises a majority of said body.

13. A scale according to claim 12, wherein the body further comprises a surface of natural stone and a base of natural stone.

14. The scale according to claim 12, wherein the stone is particulate and molded to a desired shape with a binder.

15. The scale according to claim 14, wherein the binder comprises a resin.

16. The scale according to claim 12, wherein the natural stone comprises granite.

17. The scale according to claim 12, wherein the natural stone comprises marble.

* * * * *